United States Patent Office 3,511,868
Patented May 12, 1970

3,511,868
NOVEL FLUORINE CONTAINING COMPOUNDS AND PROCESS
Samuel Gelfand, Niagara Falls, N.Y., assignor to Hooker Chemical Corporation, Niagara Falls, N.Y., a corporation of New York
No Drawing. Filed Feb. 26, 1964, Ser. No. 347,344
Int. Cl. C07c 45/00, 41/00, 69/64
U.S. Cl. 260—463        10 Claims

ABSTRACT OF THE DISCLOSURE

This invention is directed to fluorine compounds and their preparation by the chlorination of 1-chloro-2-methoxyhexafluorocyclopentene in the presence of a photochemical initiator. The novel fluorine compounds are useful as pesticides or fireproofing agents.

---

This invention relates to novel fluorine containing compounds and to processes for their preparation. More specifically, the present invention relates to novel fluorine containing compounds prepared by the chlorination of 1-chloro-2-methoxyhexafluorocyclopentene.

The compounds of the present invention are useful as pesticides, as intermediates in the preparation of fireproofing compounds, and as lubricants, as will be more fully enumerated upon herein.

In accordance with this invention there are provided novel compounds as represented by the formula:

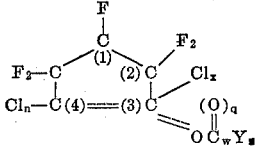

wherein Y is selected from the group consisting of hydrogen, chlorine and mixtures thereof, $n$ is from 1 to 3; $x$ is from 0 to 1; Z is zero, 1 or 3; $w$ is zero or 1, said $w$ being zero when Z is zero; $q$ is zero or 1, said $q$ being 1 when carbon atoms number 3 and 4 are bonded together by a double bond and Z and $n$ are 1, said $n$ being 2, $x$ being 1 and Z being 3 when carbon atoms 3 and 4 are bonded together by a single bond and carbon atom 3 is bonded to the oxygen atom by a single bond; said $n$ being 2, $x$ being zero and Z being zero when carbon atoms 3 and 4 are bonded together by a single bond and carbon atom 3 is bonded to the oxygen atom by a double bond; said $n$ being 1, $x$ being zero, and Z being 3 when carbon atoms number 3 and 4 are bonded together by a double bond and carbon atom number 3 is bonded to the oxygen by a single bond. Also included within the present invention are those compounds wherein Z is two and Y is chlorine and hydrogen.

More specifically the novel compounds of the present invention are selected from the group consisting of the compounds as represented by the following formulae:

(I) 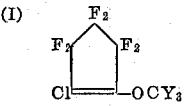   (II) 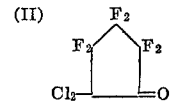

(III) 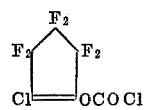

and mixtures thereof wherein Y is selected from the group consisting of hydrogen, chlorine, and mixtures thereof.

Illustrative examples of the compounds falling within the scope of the present invention include but are not limited to the following:

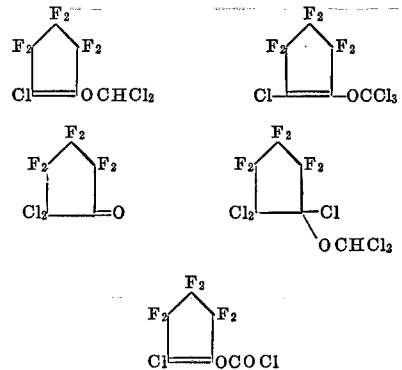

The novel compounds of the present invention represented by Formulas I and II are prepared by the chlorination of a compound of the formula

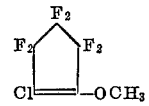

in the presence of an initiator like photochemical light and at a temperature of from about 40 degrees centigrade to 150 degrees centigrade. The preferred temperature to be utilized will be dependent on the products desired, however it is in the range of 40 degrees centigrade to 100 degrees centigrade. The compound as represented by the Formula III is prepared by the reaction of the compound of the formula

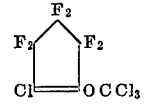

with a strong acid such as sulfuric acid at a temperature of about 80 degrees centigrade to 180 degrees centigrade.

The amount of chlorine to be employed will be a function of the degree of chlorination desired and generally is in the range from about 2 moles of chlorine to one mole of the compound 1-chloro-2-methoxy hexafluorocyclopentene to about 5 moles of chlorine per mole of 1-chloro-2-methoxy hexafluorocyclopentene with a preferred range being 2.5 to 3.5. The molar ratio of acid, i.e. sulfuric acid to $C_5OCCl_4F_6$ will be 1 mole of sulfuric to 1 mole of $C_5OCCl_4F_6$ up to 10 moles of sulfuric to one mole of $C_5OCCl_4F_6$.

The reactions occurring are believed to be proceeding in the following manner, but not necessarily in the order given, although it is not intended to be limited by theory.

(1) Successive substitutive chlorination of the hydrogen atoms in the methoxyl group.

(2) Additive chlorination to the double bond between carbon atoms 3 and 4. This reaction is favored by a low temperature.

(3) Chlorinalysis reactions or decomposition reaction with C—O cleavage. The compound 1,1,1-dichlorohexafluorocyclopentane-2-one produced in this manner and 1,2-dichlorohexafluorocyclopentene can also be isolated in this step. A specific reaction for preparing a specific novel compound of the present invention is represented by the following equation.

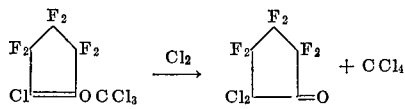

The photochemical light employed for promoting the halogenation reaction may be one of any of the well known commercial light sources which induces or increases the halogenation reaction such as tungsten filament lamps, ultraviolet lamps, mercury vapor arc lamps, fluorescent lamps, ordinary light bulbs, and the like.

The products obtained by practicing the above-mentioned process are generally separated by any separation method known in the art such as distillation, gas chromatography and the like, as will be more fully demonstrated in the working examples.

In a preferred embodiment of the present invention, 1-chloro-2-methoxyhexafluorocyclopentene and chlorine are heated together at a temperature from 75 to 90 degrees centigrade in the liquid phase, and in the presence of ultraviolet light, and the resulting mixture is purified by distillation. The reactions occurring may be illustrated by the following specific equations which are not intended to be limiting:

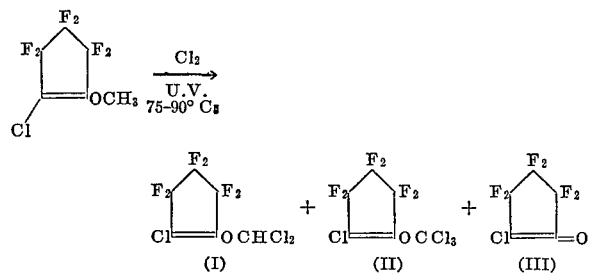

After separation by distillation techniques, compound II can be converted to the chloroformate by reaction with sulfuric acid. The reaction occurring is illustrated by the following equation:

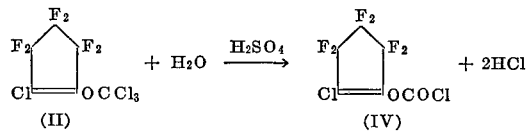

Further, the compound represented by Number IV can be converted to the oxide by hydrolysis and rearrangement of the products as illustrated by the following equation:

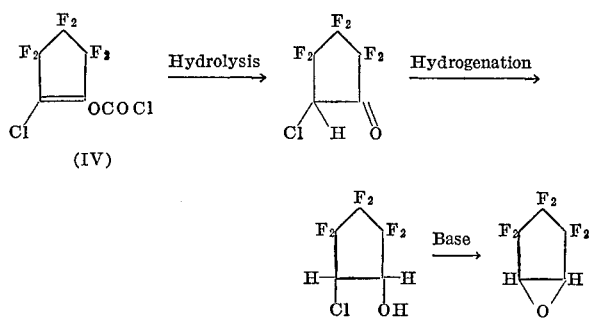

A solvent is not generally necessary, but one can be used to moderate or facilitate the reaction. Among the solvents which may be used are halogenated hydrocarbons like carbon tetrachloride. Other solvents of high enough boiling point to maintain the required reaction temperature and which do not react with either the selected starting reagents may be utilized.

As pesticides the compounds of the present invention may be used per se or together with a variety of formulations.

For example, the products purified or crude may be combined with other biocides or pesticides, including insecticides, such as DDT, methoxychlor, lindane, aldin, endrin, DDD, BHC, parathion, malathion, methyl parathion, lead arsenate, calcium arsenate, rotenone, allethrin, pyrethrum, nicotine, summer oils, dormant oils, dinitroalkylphenols, dinitrocresols, chlordane, heptachlor, insecticidal carbamates and organophosphates; chlorinated terpenes, dimeton, thiophosphates and dithiophosphates such as O,O-dimethyl-S-oxo - 1,2,3 - benzotriazin - 3(4H) - yl-methylphosphorodithioate; (O,O-diethyl-O(2-isopropyl-6-methyl-4 - pyrimidinyl)phosphorothioate); the composition marketed under the trademark "Dibrom," etc., miticides such as bis (pentachlorocyclopentadienyl), chlorinated arylsulfonates, chlorinated diarylsulfones and the like, fungicides such as sulfur, dithiocarbamates and N-trichloromethylthio-4-cyclohexene-1,2 - dicarboximide to list but a few.

It is also desirable to combine the products of this invention with a class of potentiators or synergists known in the insecticidal art as "knockdown agents." These substances are insecticides which when combined with other insecticides will shorten the time required, or reduce the amounts of the insecticide necessary to effect total immobilization (knockdown) or death of the insect to be controlled. Among the large number of synergists which may be used for this purpose are the organic thiocyanates and the water soluble organophosphates, such as phosdrin, and (2,3,4-methylenedioxyphenoxy)-3,6,9-trioxaundecane, to name but a few.

As fireproofing agents the compounds of the present invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually the additives are mixed with the polymer in the molten state at temperatures that can range from the melting point to the decomposition temperature of the polymer. Alternatively the additives and polymer are dry-blended in the finely divided state so that an intimate mixture is obtained upon subsequent molding or extrusion.

The chlorinated compound of the instant invention is desirably incorporated in polymeric materials in the range from about ten to about fifty percent by weight of the polymer composition, preferably from about twenty to about thirty-five percent by weight. An antimony compound can be used in amounts ranging from less than one to about thirty percent by weight of the polymer composition, preferably from about ten to about twenty percent by weight.

In order that those skilled in this art may better understand the present invention, the manner which it may be practiced, the following specific examples are given.

In the specification, examples, and claims parts are by weight and temperatures are in degrees centigrade unless otherwise indicated.

EXAMPLE 1

2400 grams (10.0 moles) of 1-chloro-2-methoxyhexafluorocyclopentene was charged into a 5 liter 3 necked flask equipped with a gas inlet tube, stirrer, thermometer and Dry Ice-acetone cooled condenser and illuminated with a 250 watt ultraviolet lamp. The temperature was maintained at 85–95° centigrade and a total of 2012 grams (28.7 moles) of chlorine was introduced over a 24 hour period. After purging with air to remove dissolved hydrogen chloride the crude product (3535 grams) was charged to a still and fractionated at atmospheric pressure through a thirty inch long column packed with ⅛ inch helices.

| Identity | Boiling Point, °C. | Refractive Index | Weight, grams |
|---|---|---|---|
| Fraction No.: | | | |
| 1 ............ Foreshot ............ | 70.5–73 | $N_D^{20}=1.4252$ | 31 |
| 2 ............ Mainly $CCl_4$ ............ | 74–77 | $N_D^{20.5}=1.4242$ | 659 |
| 3 ............ Intermediate ............ | 78.5–88 | $N_D^{20.5}=1.3720$ | 112 |
| 4 ............ Mainly 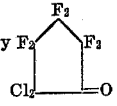 | 88–89 | $N_D^{20}=1.3574$ | 690 |
| 5 ............ Intermediate ............ | 90–154.5 | $N_D^{20.5}=1.3958$ | 213 |
| 6 ............ 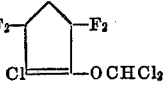 | 155.5–156.5 | $N_D^{20.5}=1.4045$ | 241 |
| 7 ............ 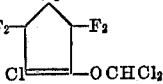 | 157–157.2 | $N_D^{20.8}=1.4051$ | 183 |
| 8 ............ 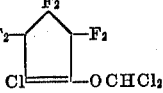 | 158–159 | $N_D^{21}=1.4058$ | 141 |
| 9 ............ Intermediate ............ | 160–167 | $N_D^{21}=1.4087$ | 198 |
| 10 ........... 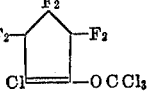 | 168–169 | $N_D^{21}=1.4129$ | 827 |
| 11 ........... Column holdup and residue ............ | | 1.4347 | 172 |

The various main fractions were identified as follows.
Fraction four was identified as 2,2-dichloro-3,3,4,4,5,5-hexafluorocyclopentanone as follows.

(1) Analysis for total chlorine.—Theoretical for $$C_5Cl_2F_6O$$

27.2% chlorine. Found: 26.8% chlorine.

(2) The infrared absorption spectrum showed absorption characteristic for the carbonyl group at 5.5μ.

(3) 50 grams (0.19 mole) of fraction No. 4 was stirred with 42 grams (0.5 mole) of an aqueous solution of sodium bicarbonate at 30 degrees centigrade until evolution of carbon dioxide ceased. The reaction mixture was acidified, extracted with three portions of ether, dried, and the ether distilled off. The residue was distilled at reduced pressure to give 28 grams of product, boiling point 90–92 degrees centigrade at 4.5 millimeters Hg pressure.

A sample was titrated with standard 0.1 normal sodium hydroxide solution. Equivalent weight: Found 264.7. Theoretical for $CCl_2=CF-CF_2-CF_2CO_2H$: 259.

($CCl_2=CF-CF_2-CF_2-CO_2H$ formed from

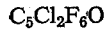

by following series of reactions.)

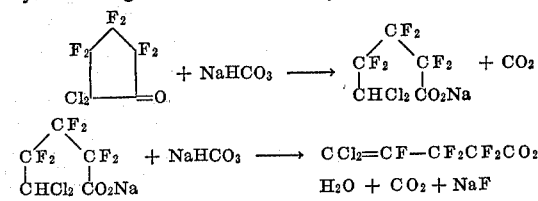

Fraction 2.—Identified by gas chromatography: From residence time identified to contain 74.2 percent carbon tetrachloride and 22.4 percent of compound of fraction 4.

EXAMPLE 2

600 grams (2.5 moles) of 1-chloro-2-methoxyhexafluorocyclopentene was chlorinated with 532 grams of chlorine over a 40 hour period and fractionated in a manner similar to Example 1.

The fraction boiling at 155–156 degrees centigrade $N_D^{20}$ 1.4042 was analyzed for total chlorine.

Percent chlorine.—Found: 34.7%.

Theory for $C_6HCl_3F_6O$ (1-chloro-2-dichloromethoxyhexafluorocyclopentene): 34.2%.

The fraction boiling at 169–169.5° C. $N_D^{20.5}$ 1.4123 was analyzed for total chlorine.

Percent chlorine.—Found: 40.0%.

Theory for $C_6Cl_4F_6O$ (1-chloro-2-trichloromethoxyhexafluorocyclopentene): 41.0%.

EXAMPLE 3

Preparation of (2-chlorohexafluorocyclopenten-1-yl) chloroformate

A mixture of 750 grams (2.18 moles) of 1-chloro-2-trichloromethoxyhexafluorocyclopentene and 750 grams of concentrated sulfuric acid was stirred and heated at 108° centigrade with vigorous evolution of hydrogen chloride. When the HCl evolution slowed the temperature was gradually raised to reflux and the product slowly distilled off and collected. When the pot temperature reached 171 degrees centigrade distillation ceased and reaction was complete. The crude product was washed with water, dried and distilled, boiling point 126–126.5 degrees centigrade at atmospheric pressure, yield 436 grams (88.6%).

The infrared absorption spectrum showed absorption at 5.54μ characteristic for the carbonyl group.

Analysis for total chlorine.—Calculated for $C_6Cl_2F_6O_2$: 24.6%. Found: 24.4%.

While there have been described various embodiments of the invention, the methods and elements described are not intended to be understood as limiting

What is claimed is:

1. A compound selected from the group consisting of

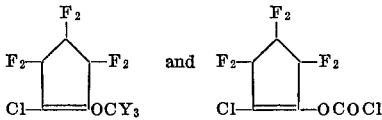

wherein Y is selected from the group consisting of hydrogen and chlorine provided that at least two of said Y's is chlorine.

2. A compound of the formula

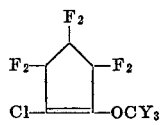

wherein Y is selected from the group consisting of hydrogen and chlorine, provided that at least two of said Y's is chlorine.

3. A compound of the formula

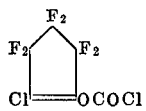

4. A process for the preparation of a compound of the formula

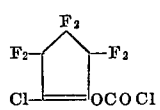

comprising reacting a compound of the formula

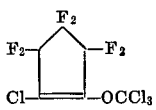

with from about 1 to about 10 moles of sulfuric acid per mole of said compound.

5. A process for the preparation of (2 - chlorohexafluorocyclopentene-1-yl)chloroformate which comprises reacting 1 - chloro - 2 - trichloromethoxyhexafluorocyclopentene with sulfuric acid at a temperature of from 80 degrees centigrade to 180 degrees centigrade.

6. A process for the preparation of compounds of the formulae:

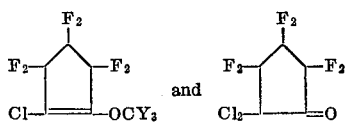

wherein Y is selected from the group consisting of hydrogen, and chlorine provided that at least two of said Y's is chlorine, which comprises reacting a compound of the formula:

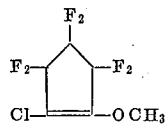

with about 2 to about 5 moles of chlorine per mole of said compound, said chlorination occurring in the presence of a photo chemical initiator and a temperature of from about 40 degrees centigrade to 150 degrees centigrade.

7. A process which comprises reacting 1-chloro-2-methoxyhexafluorocyclopentene with from 2 to 5 moles of chlorine per mole of 1 - chloro - 2 - methoxy - hexafluorocyclopentene in the presence of a photochemical initiator and at a temperature of from about 40° C. to 150° C.

8. A process in accordance with claim 7 wherein ultraviolet light is employed as the photochemical initiator.

9. A process in accordance with claim 7 wherein the temperature employed is from about 75 degrees centigrade to about 100 degrees centigrade and wherein the molar ratio of chlorine to 1 - chloro - 2 - methoxyhexafluorocyclopentene is from about 2.5 to about 3.5.

10. A process for the preparation of 1-chloro-2-trichloro methoxy hexafluoro cyclopentene which comprises reacting 1 - chloro - 2 - methoxy hexafluoro cyclopentene with chlorine in the presence of ultraviolet light at a temperature of about 75 degrees centigrade to about 100 degrees centigrade, wherein about 2 to about 5 moles of chlorine per mole of trichloromethoxy reactant are employed.

References Cited

UNITED STATES PATENTS 2,712,554    7/1956    Miller _____ 260—586

FOREIGN PATENTS 625,287    8/1961    Canada.

OTHER REFERENCES

Shepard et al.: "J. Org. Chem., vol. 23 (1958), pp. 2011–2012.

LORRAINE A. WEINBERGER, Primary Examiner

V. GARNER, Assistant Examiner

U.S. Cl. X.R.

204—158; 252—8.1; 260—586, 611, 617, 348, 539; 424—138, 139, 164, 192, 224, 264, 282, 300, 303, 331, 337, 339, 311, 348, 346, 352